United States Patent
Jacquet

(10) Patent No.: US 12,443,950 B2
(45) Date of Patent: Oct. 14, 2025

(54) METHOD AND SYSTEM FOR PERFORMING ELECTRONIC TRANSACTIONS

(71) Applicant: COINED INVESTMENT POOL COMPANY AB, Stockholm (SE)

(72) Inventor: David Jacquet, Bromma (SE)

(73) Assignee: COINED INVESTMENT POOL COMPANY AB, Stockholm (SE)

( * ) Notice: Subject to any disclaimer, the term of this patent is extended or adjusted under 35 U.S.C. 154(b) by 393 days.

(21) Appl. No.: 17/620,711

(22) PCT Filed: Jun. 22, 2020

(86) PCT No.: PCT/SE2020/050639
§ 371 (c)(1),
(2) Date: Dec. 19, 2021

(87) PCT Pub. No.: WO2020/263162
PCT Pub. Date: Dec. 30, 2020

(65) Prior Publication Data
US 2024/0013207 A1   Jan. 11, 2024

(30) Foreign Application Priority Data
Jun. 25, 2019   (SE) .................... 1950780-5

(51) Int. Cl.
*G06Q 20/38* (2012.01)
*H04L 9/00* (2022.01)
*H04L 9/32* (2006.01)

(52) U.S. Cl.
CPC .......... *G06Q 20/389* (2013.01); *H04L 9/3239* (2013.01); *H04L 9/50* (2022.05)

(58) Field of Classification Search
CPC ........ G06Q 20/389; H04L 9/50; H04L 9/3239
(Continued)

(56) References Cited

U.S. PATENT DOCUMENTS 11,025,409 B1 *   6/2021   Fields .................. H04L 9/30
11,387,979 B2 *   7/2022   Narayanam ........... G06F 3/067
(Continued)

FOREIGN PATENT DOCUMENTS

WO   WO-2018119930 A1 *   7/2018   .......... G06Q 20/401
WO   2019032089 A1   2/2019
(Continued)

OTHER PUBLICATIONS

NPL Search (Year: 2017).*
(Continued)

*Primary Examiner* — Lynn D Feild
*Assistant Examiner* — Saad Ahmad Abdullah
(74) *Attorney, Agent, or Firm* — Tucker Ellis LLP

(57) ABSTRACT

Method for performing an electronic transaction, comprising the steps: a) a first user client (110) digitally sending to a first node (150) transaction information, comprising a first user predictable transaction counter, which is unique for the combination of the first user and the electronic transaction in question; and a user transaction state digest, which is the output of a one-way function calculated based on previous electronic transactions registered in relation to the first user; b) the first node (150) affirming the transaction information; c) the first node (150) digitally communicating the transaction information to additional nodes (160,170) on an electronic transaction network of such nodes; d) at least one of
(Continued)

said additional nodes (160,170) affirming the transaction information; e) verifying that at least a predetermined number of nodes have affirmed the trans-action information; and f) registering a transaction based upon said transaction information and digitally disseminating information to all nodes (150,160,170) on said network regarding positive affirmation status of at least said predetermined number of nodes.

21 Claims, 3 Drawing Sheets

(58) Field of Classification Search
USPC .......................................................... 713/176
See application file for complete search history.

(56) References Cited

U.S. PATENT DOCUMENTS

| | | | |
|---|---|---|---|
| 2015/0019442 A1* | 1/2015 | Hird | H04W 12/041 |
| | | | 726/30 |
| 2017/0236102 A1* | 8/2017 | Biton | G06Q 20/0655 |
| | | | 705/64 |
| 2017/0366516 A1* | 12/2017 | Pattanaik | H04L 9/3236 |
| 2018/0117447 A1 | 5/2018 | Tran et al. | |
| 2018/0205555 A1 | 7/2018 | Watanabe et al. | |
| 2018/0309567 A1 | 10/2018 | Wooden | |
| 2019/0057454 A1 | 2/2019 | Komenda et al. | |
| 2019/0132131 A1* | 5/2019 | Clements | H04L 9/3239 |
| 2022/0329409 A1* | 10/2022 | Collinge | H04L 67/1097 |

FOREIGN PATENT DOCUMENTS

| | | |
|---|---|---|
| WO | 2019072263 A2 | 4/2019 |
| WO | 2019072278 A2 | 4/2019 |
| WO | 2019072312 A2 | 4/2019 |

OTHER PUBLICATIONS

Pugh "Nano Documentation Original RaiBlocks/Nano Whitepaper" Nano, Nov. 2017 (Year: 207).*
"The ZILLIQA Team, The ZILLIQA Technical Whitepaper, Aug. 10, 2017" (Year: 2017).*
International Search Report from corresponding International Application No. PCT/SE2020/050639, mailed on Oct. 16, 2020, 5 pages.
The Zilliqa Team, "The Zilliqa Technical Whitepaper", Retrieved from the Internet: URL: https://docs.zilliqa.com/whitepaper.pdf; dated Aug. 10, 2017, 14 pages.
Alexander Chepurnoy et al., "A Cryptocurrency with Stateless Transaction Validation", IACR Cryptology ePrint Archive 2018, 18 pages.
Davide Frey et al., "Dietcoin: shortcutting the Bitcoin verification process for your smartphone", Retrieved from the Internet: URL: https://arxiv.org/abs/1803.10494, Mar. 28, 2018, 19 pages.

* cited by examiner

METHOD AND SYSTEM FOR PERFORMING ELECTRONIC TRANSACTIONS

The present invention relates to a method and a system for performing electronic transactions. In particular, the invention relates to such a method and system for performing cryptographically chained such transactions, for instance blockchain based such transactions.

Today, there are many known ways of performing cryptographically chained electronic transactions. Herein, that a transaction is "cryptographically chained" means that the transaction in question is sealed using a cryptographic one-way function being calculated using a previous transaction state as an input, effectively chaining consecutive transactions to each other in a cryptographic chain which is possible to verify mathematically in retrospect. Such transaction chains are generally perceived as safe, and may be implemented in a distributed manner with high availability for interested parties.

In case a set of individual transactions are collected and signed on a group level, the transaction chain is generally called a blockchain.

One main concern for such chained transactions is transaction throughput. Major protocols, such as Bitcoin, Etherium and Ripple (XRP), are generally associated with maximum throughputs that are too low to be able to serve massive amounts of concurrent users. For instance, some estimates conclude that the Bitcoin blockchain only supports in the magnitude of 10 transactions per second.

One reason for such low transaction throughputs is that chained transaction protocols must provide efficient protection against a type of fraud called "double spending", namely that a particular value amount is spent simultaneously from a spender to two different recipients. To achieve this, numerous blockchain protocols use a deliberately time-consuming or otherwise difficult task (such as a so-called "proof-of-work") in combination with a consensus algorithm guaranteeing that consensus is present throughout a network of blockchain nodes that a current state of the blockchain is indeed valid.

Such proof-of-work will typically lead to high energy transaction costs.

Apart from being protected against double spending and offering high maximum transaction throughput, a system for chained transactions should also offer short transaction validation and settling times. For instance, with the Bitcoin protocol, it is conventional to wait for a certain number of blocks, such as up to six blocks, to be "mined" before a transaction is considered fully validated. This may take up to an hour of time, which is a relatively long time period for transaction parties to wait before a final validation to be available.

Furthermore, a chained transaction system should offer full transparency for participating users, and also the possibility for adequate anonymity when so is required.

Such a chained transaction system should also be flexible, dynamically implementable and scalable, being able to expand or retract quickly in reaction to shifting user needs.

In addition to these requirements, it is also desirable in some circumstances that superuser functionality is supported, so that a trusted central party, such as a central bank, can control individual transactions, such as to block fraudulent activity and seize funds, and to ban certain participants.

Furthermore, safe rollback of the chained transactions should preferably be possible in case of fraud or misconduct in any other way.

The present invention aims at solving at least some of the above described problems.

Hence, the invention relates to a method for performing an electronic transaction, comprising the following steps: a) a first user client digitally sending to a first node transaction information, which transaction information comprises a first user predictable transaction counter, which is unique for the combination of the first user and the electronic transaction in question; and a user transaction state digest, which is the output of a one-way function calculated based on previous electronic transactions registered in relation to the first user; b) the first node affirming the transaction information; c) the first node digitally communicating the transaction information to additional nodes on an electronic transaction network of such nodes; d) at least one of said additional nodes affirming the transaction information; e) verifying that at least a predetermined number of nodes have affirmed the transaction information; and f) registering a transaction based upon said transaction information and digitally disseminating information to all nodes on said network regarding positive affirmation status of at least said predetermined number of nodes.

In the following, the invention will be described in detail, with reference to exemplifying embodiments of the invention and to the enclosed drawings, wherein.

Figure 1:
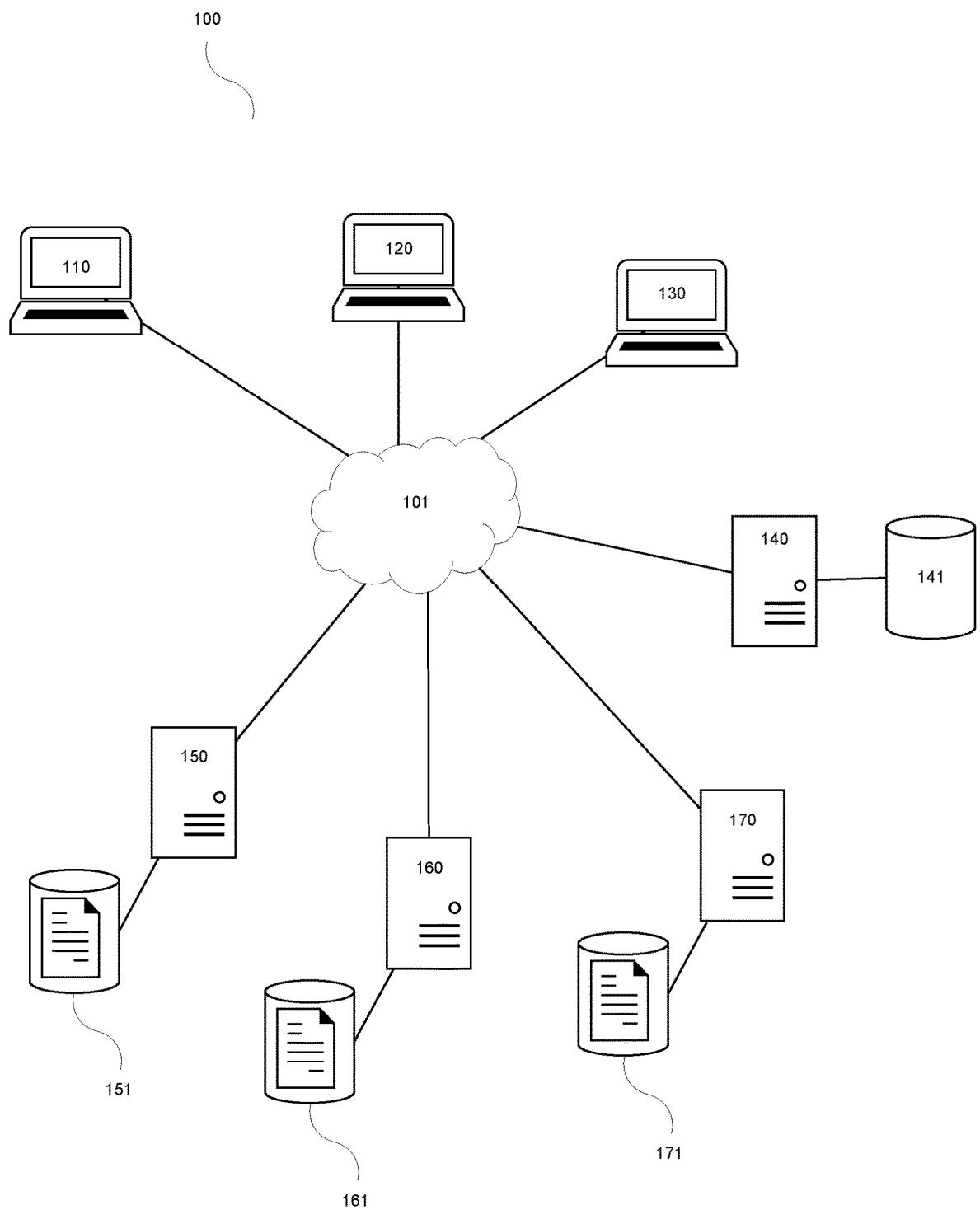
FIG. 1 is an overview of a system in which a method according to the present invention can be implemented.

FIG. 1 illustrates a system 100 in which a method according to the present invention can be implemented. The various components of the system 100 are interconnected via the internet 101, or via any other suitable digital wide area network.

The system 100 comprises a number of computer clients 110, 120, 130, each being a physical general-purpose programmable computing entity such as a personal computer, a tablet computer or a smartphone; or a virtual general-purpose programmable computing entity, such as a distributed or hypervised virtual computing resource. Each computer client 110, 120, 130 is arranged to execute, such as on or from hardware of the client 110, 120, 130 in question, a client software function, which in turn is arranged to perform the steps prescribed for the computer clients 110, 120, 130 according to the present method. Such functionality, for instance, comprises communications with other entities, data processing/calculation and storage.

Each computer client 110, 120, 130 is generally arranged to allow one particular user to access the system 100, and in particular to request/perform digital transactions as will be described hereinafter. Each computer client 110, 120, 130 may also be arranged to allow the user to access and edit user account information from the below-described account server 140. To this extent, each computer client 110, 120, 130 may be arranged to provide an interactive user interface to the respective user in question. For instance, such a user interface may be an interactive graphical user interface presented on a screen display of the computer client 110, 120, 130 in question. The system 100 can also serve automated users, and in this and other cases each client 110, 120, 130 may provide a digital interface such as an API (Application Programming Interface) via which it accepts commands and so forth.

Computer hardware comprised in a computer client 110, 120, 130, or on which the computer client 110, 120, 130 is arranged to run, typically comprises at least one CPU, at least one RAM memory and at least one computer bus.

The system 100 further comprises a computer account server 140, which may be of the corresponding type as described in relation to said computer clients 110, 120, 130. Hence, the account server 140 may be physical or virtual, and arranged to run a particular account server software function in turn arranged to perform the method steps prescribed for the account server 140 by the present method.

In general, the account server 140 is arranged to keep a current resource account for at least one of said users. Such an account may be a financial account, holding some type of value in any currency, including digital currencies, or ownership shares of any type. The account server 140 may hence belong to a bank. However, in preferred embodiments the account is system 100 internal, in the sense that the account server 140, including the held account, is an integrated part of the system 100, not providing any external interfaces via which third parties can gain access to account information. The account server 140 can be an integrated functional part of each node 150, 160, 170, for instance so that no account changes are permitted without the nodes voting on such changes as will be described below.

Account information is kept in a digital database 141.

The system 100 also comprises a number of computer transaction nodes 150, 160, 170, of corresponding constitution as said computer clients 110, 120, 130. Hence, the nodes 150, 160, 170 are each associated (in a manner corresponding to what has been described in relation to computer clients 110, 120, 130) with a respective node software function, arranged to perform the present method steps in relation to said nodes 150, 160, 170. In particular, the nodes 150, 160, 170 are responsible for keeping track of, validating and registering digital transactions of the present type. Each one of the computer clients 110, 120, 130 comprises or is in contact with a respective hardware and/or software database 151, 161, 171, each in turn holding information about a digital ledger in which said transactions are registered as will be described in the following. Each such database 151, 161, 171 may also comprise information regarding registered users in the system 100, including user identifying information and user state information (see below).

The system 100 may comprise at least 5, preferably at least 10, interconnected nodes of said type, each participating in the voting procedure described below for individual transaction requests. There may be no one-to-one association between individual nodes 150, 160, 170 and individual users. In other words, all nodes may serve all users of the system 100. Then, for each node 150, 160, 170 there may be more than one user, such as at least 10 users, or even at least 100 or at least 1000 users per node.

Each node 150, 160, 170 may store a partial or a complete ledger for at least one user, or at least for some users, or even for all registered users. In particular, each node 150, 160, 170 may store a partial ("frontier state", see below) ora complete ledger for each user being a party to a transaction of the present type. Each stored ledger may comprise, for each user for which information is stored, a complete set of transactions counting from the most recently registered transactions and going backwards in time up to a certain respective earliest stored transaction. The case of a partial ledger is discussed in further detail below.

In general, both the digital ledger and additional information about users registered with the system 100 is kept in a respective digital copy by each node 150, 160, 170, and these individual copies are kept synchronized as an automatic result of the transaction processing procedure described below. Some nodes may be required to hold the entire ledger (the entire transaction history), while other nodes may only be required to hold a more recent sets of transactions (such as the "frontier state" of the ledger, see below).

The nodes 150, 160, 170 together form a "network of nodes", which nodes may be interconnected on the public internet and may be arranged to communicate with each other using well-defined interfaces and using encrypted channels to avoid eavesdropping.

In general, everything which is said herein regarding the computer clients 110, 120, 130 equally applies to said client software function. The corresponding is also true regarding the account server/account software function, as well as to the transaction nodes/node software function. Each of said entities 110, 120, 130, 140, 150, 160, 170 are provided with suitable digital communication interfaces for performing communication with other system 100 internal entities and, as the case may be, with external entities. All communication described herein may be encrypted, for instance based on PKI (Public Key Infrastructure) encryption. All communication may furthermore be asynchronous, message-based communication between the respective entities involved. Hence, each entity may for instance implement a message queue, handling each incoming message in order, resulting in some action and/or a further message (or response message) being sent.

There may be several different account servers 140, each serving one or several users. Each node 150, 160, 170 may comprise account server 140 functionality, as mentioned above. Furthermore, there may be any number of computer clients, such as at least 10 computer clients, at least 100 computer clients or even at least 1000 computer clients.

Each registered user may use any one of said clients 110, 120, 130, and be identified to the system 100 (such as to a node 150, 160, 170 to which a piece of transaction information is sent) by a per se conventional login or similar.

Figure 2:
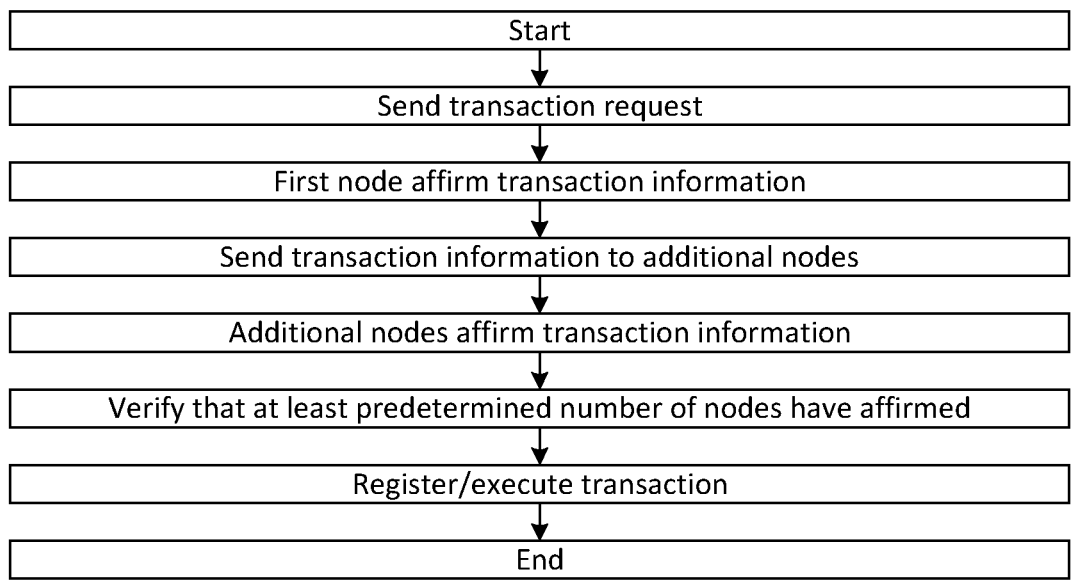
FIG. 2 is a flowchart illustrating a method according to the present invention.

FIG. 2 illustrates a method according to the present invention, for performing an electronic, digital transaction.

In a first step, the method starts.

In a subsequent step, a first computer client 110 digitally sends, to a first transaction node 150, a transaction request comprising transaction information. This transaction information may be in the form of a message sent form the first client 110 to the first node 150 containing a set of information defining a transaction that a user (a "first" user) of the first computer client 110 desires to register and execute.

The transaction may be a financial transaction, such as defining a certain monetary value to be transferred to or from a first user account held by the account server 140. However, the transaction may also define any other state change in relation to the first user and/or the first computer client 110 operated by the first user, such as a first user personal information update transaction; a first user cryptographic key change or update transaction; or a first user addition or user removal transaction (removing a particular user from the system as an active user, for instance on the initiative of a super user). See below for examples.

Hence, as used herein the word "transaction" is to be interpreted broadly, as a digitally defined, electronically communicated system 100 state change in relation to at least one identified user. Such transactions are generally validated by the system 100 (and in particular, by the nodes 150, 160, 170), registered in said ledger and executed. The execution may take place completely in a system 100 internal manner, such as by an update of information identifying the user, or state information, stored in databases 151, 161 and/or 171; or involve external parties, such as involving a money transfer order involving external money accounts.

In a preferred embodiment, the account server 140 is part of the system 100, and all transactions involving the transfer of value are executed in relation to the accounts held and defined by the account server 140, whereby the execution of the transactions described herein does not involve the activation of any external value account holding entities. In other words, the value transferred due to transactions of the present type are in this case only performed between registered users of the system 100, via interfaces provided by clients 110, 120, 130. Furthermore in this case, there may be additional types of transactions defined, involving external entities, such as external value deposit and withdrawal transactions.

The transaction information sent from the first client 110 to the receiving node 150 preferably defines the desired transaction completely to the system 100.

In particular, said transaction information comprises a first user predictable transaction counter, which counter is unique for the combination of the first user and the transaction in question. That the counter is "unique" means that no two transactions initiated by a particular user are the same. In some embodiments, the user transaction counter is however not unique across several different users of the system 100, which different users exist in addition to the first user requesting the transaction defined by the transaction information in question.

That the counter is "predictable" means that it is possible for the receiving node 150 to unambiguously predict an expected value of the transaction counter in question, using only at least one known previous piece of transaction information and/or registered transaction (such as transaction information and/or registered transaction for the immediately preceding transaction) initiated by the same user, and in particular using a respective transaction counter value of such previous transaction information. For instance, the transaction counter may be, for each individual user, a respective simple monotonically increasing numerical counter (1, 2, 3, . . . ).

The transaction information further comprises a user transaction state digest. The user transaction state digest may be the output of a one-way function calculated based on at least one previous electronic transaction registered in relation to the same first user, preferably based on several or even all such previous electronic transactions, in many cases at least based on at least an immediately preceding transaction registered in relation to the same first user. Furthermore, the user transaction state digest may be calculated as the output of a one-way function calculated based on both the last transaction registered in relation to the requesting first user and also based on other previous transactions registered in relation to the same first user. For instance, each user state may be calculated as the last calculated result of a chain of one-way function calculations. In this and other examples, each user state digest may be calculated partly based on the value of a previous user state digest.

The one-way function may be any suitable one-way function, requiring relatively little computing resources for calculating the result of the one-way function but the result of which one-way function in practise is not sufficient to determine an input to said one-way function. Such one-way functions are well-known as such, and will not be described in further detail herein.

However, the user transaction state digest may also be a digest calculated based on respective hash values of previous transactions registered in relation to the user in question, such as all such previously registered transactions. Such hashes may then be calculated using a predetermined function. Then, the user transaction state digest may be a simple XOR of the respective hash of each of said previous transactions registered in relation to said user, which XOR value can be updated in relation to each new transaction using the previous XOR value and a hash of the new transaction.

It is understood that the first node 150 in this example is a receiving node. However, any one of said nodes 150, 160, 170 may in theory be a receiving node of a transaction request initiated by any one of said users from any one of said computer clients 110, 120, 130. Different transaction requests may be sent to different receiving nodes 150, 160, 170.

In a subsequent step, the first/receiving node 150 affirms said transaction information. This affirmation may comprise validating at least one, preferably several, of the individual pieces of information in said transaction information. These verifications may be made in relation to data stored by the first node 150, such as in the database 151. In particular, said verifications may be made at least partly in relation to information stored in said ledger and/or user-related synchronized files stored in each node 150, 160, 170 (see below for examples).

In case of an unsuccessful affirmation, such as at least one of said verifications turning out negative, the first node 150 will reject the transaction request immediately ("fast reject"), returning a failure message to the requesting client 150 without sending the transaction information to any additional nodes 160, 170.

Otherwise, in a subsequent step, the first node 150 digitally communicates the transaction information received from the first client 110 in said transaction request to additional nodes 160, 170 on the electronic transaction network of such nodes. In preferred embodiments, all nodes 150, 160, 170 participate in each transaction request, at least in capacity of potential "yes" voters. In other words, said additional nodes 160, 170 and the first node 150 together constitute all nodes 150, 160, 170 on said network.

In a subsequent step, at least some of the additional nodes 160, 170, preferably all of the additional nodes 160, 170, each perform a positive or negative affirmation of the transaction information received from the first node 150, such as performing the same verifications as performed by the first node 150 in the previous step.

For each of said additional nodes 160, 170, the outcome of the affirmation is either positive (all verifications positive) or negative (at least one verification negative). The results may be returned to the first node 150 for verification of the total number of positive affirmations from the nodes 150, 160, 170.

Hence, in a subsequent step, in the present exemplifying embodiment, at least one of said additional nodes 160, 170 affirms the transaction information as described above.

Then, in a subsequent step, it is verified that at least a predetermined number of said first 150 and additional 160, 170 nodes have affirmed the transaction information. The predetermined number may be an absolute number, or alternatively a particular percentage of the nodes 150, 160, 170 in the network, such as a percentage that is more than 50%. In some embodiments, the predetermined number is at least 60% of the total number of nodes, or even at least 70% of the nodes 150, 160, 170 having to report a positive affirmation of the transaction information in order to achieve a positive verification that at least the predetermined number of nodes have affirmed the transaction information. In the present example, the latter implies that at least two out of the three nodes 150, 160, 170 must report positive transaction information affirmation.

It is noted that, as soon as information has been received that at least the predetermined number of nodes have affirmed the transaction information, the method may proceed to the next step, without necessarily waiting for all nodes 150, 160, 170 to report their findings. Belated reporting may, for instance, be due to certain nodes being down, communication problems, and so forth.

In some embodiments, all additional nodes 160, 170 report the results of said affirmations to one particular node, such as the first (receiving) node 150. Then it is this particular node that performs the verification of affirmations. This provides for a fast, flexible system 100. However, in many embodiments, the verification of affirmations takes place at several different nodes, such as at all nodes 150, 160, 170 individually. Such individual affirmation may then take place independently in each such node 150, 160, 170, and the transaction is then also registered in each such node. As used herein, the term "register" in relation to a transaction may include both executing the transaction, such as updating the account server 140 data, as well as updating the common transaction ledger, including the block state and the user state (see below).

If the verification turns out in the negative, the transaction is as a result rejected, and the rejection is reported back to the requesting client 110, such as by the verifying node 150.

If, on the other hand, the verification turns out in the positive, in a subsequent step the transactions is registered by the verifying node 150 based upon said transaction information. Such registration may include updating the local copy of the ledger (stored in database 151) with the digital transaction, which transaction is then committed. The registration of the transaction may also comprise an execution of the transaction, such as updating user information according to the transaction information or settling a financial transaction based on the transaction information.

The verifying node 150 also digitally disseminates information to all other nodes 160, 170 on said node network regarding the positive affirmation status in relation to the transaction information of at least said predetermined number of nodes.

The other nodes 160, 170 may then also register the transaction information in their respective locally stored sets of information, including their respective locally stored copy of the ledger. This way, the ledger will be kept synchronized between nodes 150, 160, 170.

In particular, in response to said dissemination of the verified positive (above threshold) vote from the receiving node 150, all nodes 150, 160, 170 may register the transaction and update their respective local information regarding the current first user transaction counter and first user state information. Then, this updated information may be used when performing said affirming in relation to a subsequent transaction requested in relation to the same first user.

Regarding the execution of the transaction, and particularly in case of an information update type transaction, the execution (in terms of information updating) may be performed with respect to each node's locally stored information. In case the execution requires interaction with an entity external to said node network, such as a financial transaction involving an account with the account server 140, the execution is only performed once. In the latter case, the verifying node 150 may execute the transaction, or a centrally arranged monitoring service may monitor the ledger and execute each financial transaction being registered on the ledger.

In a subsequent step, the method ends.

This way, a very flexible method and system 100 is achieved for processing, registering and executing digital transactions. A user may use any node for requesting a transaction, whereupon the single receiving node disseminates the received transaction information across the network of nodes. The very simple voting algorithm described above is then performed automatically, and in case of positive voting by affirmation the transaction can be registered and executed immediately, with a minimum of time delay. The voting algorithm also provides a robust protection from double-spending, as will become clear from more concrete examples provided below.

Since all participating nodes 150, 160, 170 may be reached by the respective transaction information defining each requested transaction, each node 150, 160, 170 can at all times keep an updated copy of the ledger, which may as a result be identical across the network of nodes, at least identical apart from the latest processed transaction or transactions. The nodes 150, 160, 170 may in some embodiments only differ in terms of their "frontier state" (see below). Hence, the view of the global transaction history is kept well-defined and sufficiently synchronized (the nodes are at least in mutually non-contradictory states) across the node network at all times. A transaction registered by one node will also be registered by the other nodes reasonably soon as a result of the mechanisms described herein. In a sense, the true state of the ledger is determined by the majority vote among nodes 150, 160, 170.

The corresponding is also true regarding user information files that are also kept synchronized between nodes 150, 160, 170.

A very important aspect of the present invention is that a separate transaction chain, interlinked by said user transaction state digest, is automatically constructed and maintained by all nodes 150, 160, 170, for each individual user, which user transaction state digest chain exists independently of any blockchain structure used involving transactions with respect to several different users (see below). This user-specific chain structure makes it possible to process each requested transaction in a very rapid manner, without loosing reliability or security. This user-individual transaction chain may itself be viewed as a lightweight blockchain in and of its own right, even though the individual transactions constituting this lightweight, user-specific blockchain may also form part of a global blockchain (see below).

As mentioned above, an expected value of the first user transaction counter may be deterministically determinable (and also in fact determined) from a previous first user transaction counter used in another first user-related transaction immediately preceding the currently requested first user-related transaction. In some embodiments, each of the nodes 150, 160, 170 on the network of nodes comprises information regarding said previous first user transaction counter. Then, said affirming of the transaction information comprises verifying that the first user transaction counter provided in received transaction information matches the expected value of the first user transaction counter by comparison to the stored previous first user transaction counter.

Each of the nodes 150, 160, 170 in the network of nodes may comprise information regarding an updated user transaction state digest. Then, said local affirming in each individual node 150, 160, 170 of the of the transaction information defining the requested transaction may comprise verifying that the user transaction state digest provided in the transaction information in question matches said updated user transaction state digest in the affirming node 150, 160, 170 in question.

In a very preferred embodiment, the system 100 and the nodes 150, 160, 170 are arranged to register transactions of said type on a blockchain. Blockchains are well-known as such, and will not be explained in detail here. However, it is noted that blockchains are formed by collecting sets of transactions in blocks of transactions, each of which blocks comprising a one-way function digest (such as a hash) of a previous block, hence forming an easily verified chain of transaction blocks over time.

Namely, the method may in this case further comprise forming such blocks of verified and registered electronic transactions, each of which blocks is associated with a particular unique block identifier. Then, said transaction information may further comprise information regarding a unique block identifier associated with a previously formed one of said blocks. That the block identifier is "unique" means that it is system 100 globally unique, so that no two blocks have the same identifier. For instance, each formed block may have as unique identifier a number in a deterministically and monotonically increasing series of numbers, such as the simple number series 1, 2, 3, 4, etc.

Preferably, the transaction information is required to comprise information regarding the unique block identifier of a block which is well-defined in relation to the requested transaction, for instance based on a currently formed block of registered transactions.

In some embodiments, the system 100 is arranged to form global blocks, in the sense that formed blocks generally comprise transactions in relation to different users, in the present case in relation to both the first user and also in relation to one or several different, users, such as at least also in relation to a second user using a second client 160 to request a digital, electronic transaction.

In some embodiments, the previously formed one of said blocks the unique block identifier of which is comprised in the transaction information is not the block last formed. For instance, based on the transaction information it may be possible to unambiguously identify a block in which the requested transaction in question will form part in case it is registered.

Such identification may be based on system-global information regarding a block currently being formed. Then, each transaction information may be required to comprise a valid unique block identifier identifying a block a predetermined number of blocks back in time, such as not the last formed complete block but the block formed before that last formed complete block (see FIG. 4). This information is then verified in said transaction information affirmation performed by each node 150, 160, 170 in said network of nodes.

In one particular example, the transaction information further comprises information regarding a global, preferably synchronized between nodes 150, 160, 170, transaction time line, which is used by the first node and the additional nodes to determine to which block the electronic transaction belongs. For instance, the global transaction time line may be the number of milliseconds since Jan. 1, 1970, which is used independently by each node 150, 160, 170, in combination with a particular predetermined block formation/closing time frequency, such as once every 30 seconds, to determine a current block and as a result also a particular already closed block a predetermined number of blocks (such as two) backwards in time.

In some embodiments, the sending client 110 may time stamp the transaction in question using this global transaction time line, and the handling nodes 150, 160, 170 may then only verify this time stamp with the purpose of voting "no" if the time stamp is more than a predetermined number of seconds from an expected time stamp based on the internal clock of the other node in question.

Hence, each block may collect all transactions requested during a particular predetermined time period, as time stamped on each respective transaction provided by the sending client 110, 120, 130. Hence, in this case each block does not contain a predetermined number of transactions, but the block is rather defined by said common time line. The time period may preferably be at the most 1 minutes, preferably at the most 10 seconds, preferably at the most 5 seconds.

Furthermore, the transaction information defining said transaction request may comprise a piece of block state information or block state digest, such as relating to the same previous block as identified by said unique block identifier which is also comprised in the transaction information.

In a way corresponding to the above discussed user transaction state digest, the block state information may be calculated as a one-way function or even one-way function chain (as described above for the user transaction state digest). It may also be a XOR-type digest, calculated based on a respective well-defined hash value of each verified electronic transaction (relating also to other users) forming part of the referred-to block in question, such as the XOR of said hash values.

The block state information may also be calculated (such as using a one-way function or a XOR-type digest of said type) based on the block state information and/or the corresponding well-defined hash value of each verified electronic transaction forming part of a previous block, such as of the immediately preceding block. This way, a block chain may be constructed where the block state of each block is calculated based on all previous blocks, and in particular on all previous verified electronic transactions forming part of all previous blocks.

In addition to the above-described verifications of the user transaction counter; the user transaction state digest; and the block state digest, other verifications that may be included in the affirmation of the transaction information performed by each node 150, 160, 170 in the network of nodes comprises verifying that the requesting first user is authorized in relation to the electronic transaction. This authorization may be based upon first user information previously stored in the first 150 and additional 160, 170 nodes in question, and may be, for instance, with respect to if the first user is authorized by the system 100 to perform the type of transaction to which the requested transaction belongs. Such authorization may in turn be based on user type information stored by each node 150, 160, 170 in the network.

Furthermore, such other verifications may also comprise verifying the veracity of a first user signature comprised in the transaction information. Namely, the first user may be required to sign the transaction information using a private key (such as a private key in a private-public PKI key pair) before sending the transaction request to the first node 150. Then, the affirmation performed by all nodes may comprise verifying, using a corresponding public (known) key of the first user, that the signature was actually made using said private key.

Many of such checks will likely result in a fast reject already by the receiving node 150, before the transaction information is disseminated to the additional nodes 160, 170.

Again, if any one of said verifications fails, the affirmation of the node in question will be negative.

In some embodiments, each one of said first 150 and additional 160, 170 nodes, such as all nodes in the said network, comprises one respective first user operation counter reference for a set of different respective different types of operations a user may initiate in relation to said nodes, and in relation to the same first user in question performing the request. In this context, each such operation is initiated by requesting a corresponding transaction of a corresponding type and as described above. Examples of such operation/transaction types include "transfer funds to/from account X", "update user public key" and "update user identifying information".

Then, each of said first user operation counter references is arranged to reference a particular respective value of a corresponding respective one of said first user transaction counter. Preferably, each such user operation counter references a particular one stored value of the first user transaction counter identifying the last registered transaction of the particular transaction type for the same first user.

Then, said registration of the transaction performed by all nodes 150, 160, 170 may further comprise the node in question updating one or more relevant ones of said first user operation counter references (as stored by the node in question), depending on the type of operation or operations that the transaction in question represents. Hence, in this example the set of user operation counter references is not used for the transaction affirmation but is only updated as a result of registration of each transaction after final verification of the transaction in question.

Figure 3:
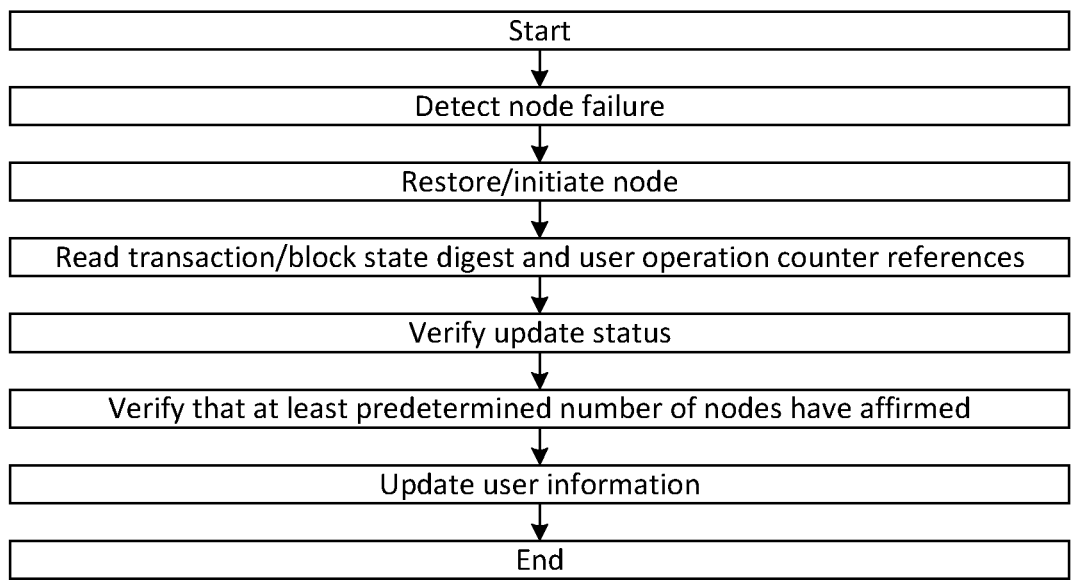
FIG. 3 is a flowchart illustrating a method also according to the present invention.

Once such user operation counter references are stored in the nodes 150, 160, 170, they can be used to restore a failing node very quickly. Such a failing node restoring method is illustrated in FIG. 3.

In a first step, which may be performed before the end of the method illustrated in FIG. 2, the method starts.

In a subsequent step, it is determined, such as by at least one node 150, 160, 170 in said network of nodes, that a particular node has failed. Such failure may consist in the particular node becoming unresponsive, being detected as faulty or hacked (see example below), or similar. The detection may be made by any other node.

In a subsequent step, the particular node is initiated, such as freshly installed and/or rebooted. At this point, the node in question may be a restored node the failure of which was previously detected. However, for freshly initiated nodes, the same method steps may be performed as described in the following.

In a subsequent step, the particular node reads a previously stored and preferably (but not necessarily) updated first user transaction state digest, as well as a previously stored and preferably (but not necessarily) updated blockchain state digest. This reading may be performed from any other node, or from a previously stored backup made by the particular node itself before failing. The read information may include one or several of the information types described below ("Frontier state") in Example 7.

In connection thereto, the particular node also reads an updated set of first user operation counter references for a particular one, several or all of the users registered with the system 100. This reading is performed from a different one of the nodes 150, 160, 170 in said network, which node has first been set in a temporary read only mode.

Hence, said particular node may read a frontier state of the below-defined type from a different node which may have first been set in a temporary read only mode. More generally, said particular node may read a minimized state, much smaller than the entire ledger but still enough to continue operations (the minimized state may be said frontier state), from a different node which may have first been set in a temporary read only mode.

In a subsequent, affirmation may be made by the particular node, using said set of first user operation counter references, verifying that first user information stored by the particular node in question is up to date. This verification may be made based on the value of each individual user operation counter reference, determining how far back in the transaction history the user-specific information must be intact. If necessary after such checs, the particular node may request updated such first user information from any other node.

Hence, the ledger held, maintained and updated in a respective identical copy of each one of the nodes 150, 160, 170 of said network of nodes is a ledger run by different, trusted, no hierarchy nodes 150, 160, 170. These nodes 150, 160, 170 approve or reject operations by voting, as has been described above. If a particular number or percentage of the participating nodes 150, 160, 170, such as a qualified majority of the nodes, approve an operation all nodes will commit the operation. Otherwise not. As opposed to many conventional blockchain cryptocurrencies, each node does not approve blocks of transactions, but instead individual operations/transactions. Hence, users get almost immediate confirmations whether a particular requested operation is approved or rejected by the network of nodes 150, 160, 170.

Figure 4:
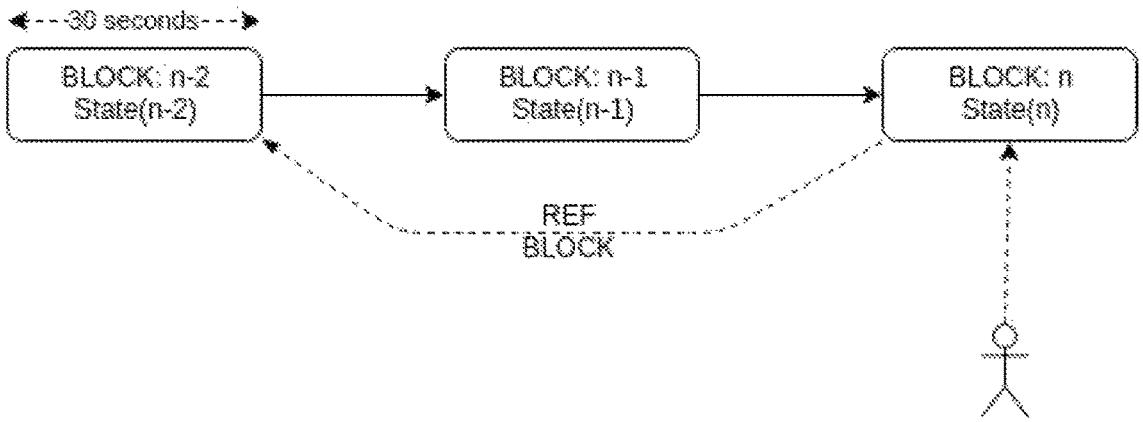
FIG. 4 illustrates the relationship between consecutive blocks.
Figure 5:
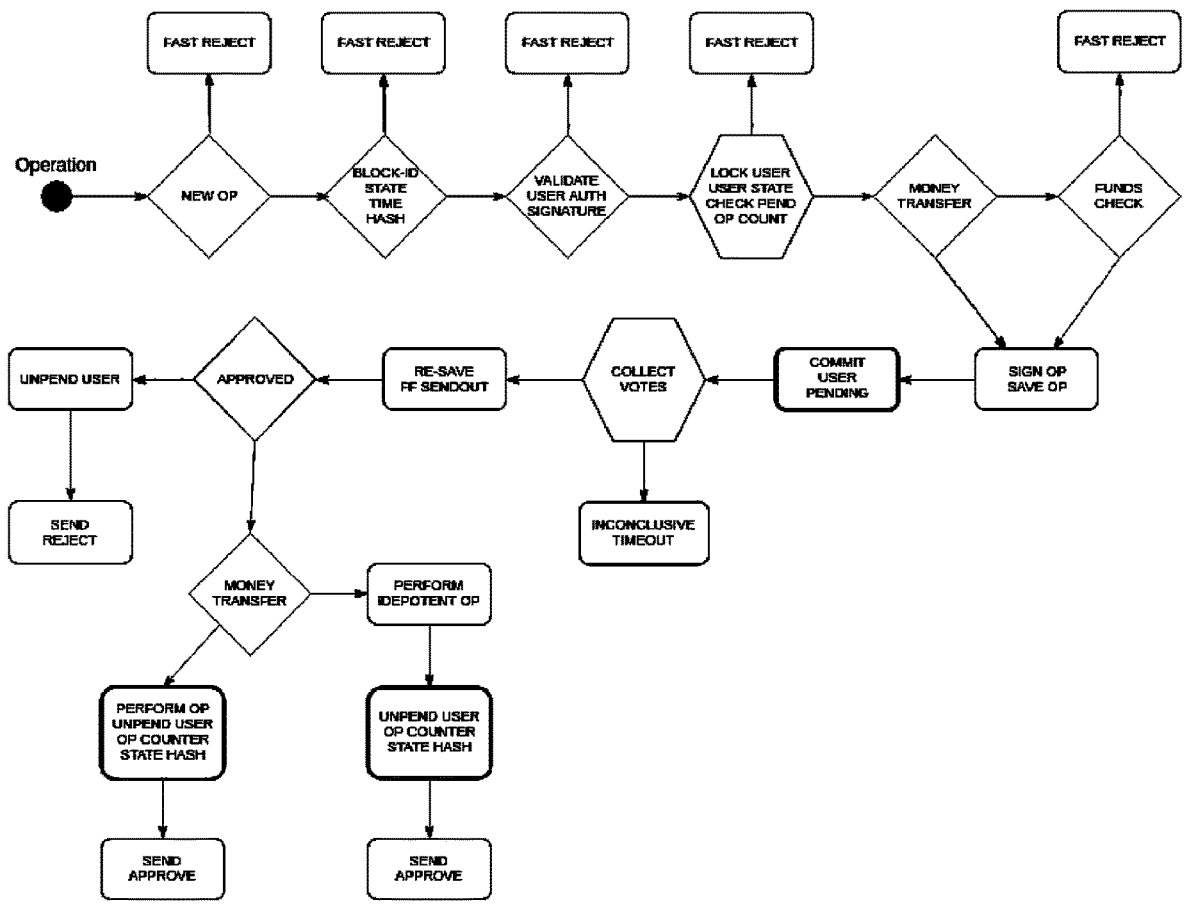
FIG. 5 is a flowchart illustrating a method also according to the present invention.

With reference to FIGS. 4 and 5, an example of a method according to the present invention will be described in the following.

Hence, a transaction request of the present type is an operation by a user previously registered with the system, defining an operation to change the common ledger. As described above, such an operation can be a monetary transfer of fund shares, or an operation to change information about the user. It is noted that all such information on which the operation operates is generally stored by each node 150, 160, 170, in a respective synchronized copy kept by each node 150, 160,170.

The transaction information in the present example comprises the following data. In general, such data is provided by the client 110, 120, 130 or user and is verified by each involved node 150, 160, 170:

requesting_user: Information identifying the user requesting the operation.

operation_user: The user on which the transaction operates, normally the requesting_user. But it could also be a super-user locking an account of a user due to suspicious activity.

counter: The number of previously committed operations for this user plus one.

epoch_ms: Number of milliseconds since UTC 1970-01-01T00:00:00.

block_id: int(epoch_ms/30000) (it is noted that the current block is directly defined by the current time).

ref_block_id: block_id minus two.

user_state: The XOR of the hashes of the respective payloads of all prior committed operations on the operation_user.

ref_block_state: XOR of all operation (registered transaction information) hashes for operations engraved on blocks up and until block identified by reference_block_id.

It is noted that in some type of transactions, such as money transfer type transactions, there may be several users involved (such as a sending and a receiving user). However, for the present purposes, it is the operation_user that defines with respect to which user the transaction in question is performed. Preferably, each transaction is performed with respect to exactly one user.

In this example (see FIG. 4), the block size is 30 seconds, and the reference block is the current block id minus two. In alternative examples, it would be possible to use other configurations, such as a block size of 1 millisecond, and a ref_block_id being 30 thousand blocks behind the block_id. In other words, in such an example, block_id=epoch_ms and refrence_block_id=block_id−30000.

FIG. 5 illustrates a more detailed scheme for processing a requested transaction. The transaction request can be sent to any node 150, 160, 170. Each node deals with an incoming set of transaction information in two distinct but similar modes—it either receives a transaction request from a user, or it receives the transaction information from another node, such as the node receiving the request from the user.

First, a number of aspects are verified with respect to the incoming transaction information:
1. Is the operation defined by the transaction information new to the node in question, or has the node already received the transaction information?
2. Are the transaction counter, the transaction time stamp, the user_state and the ref_block_state all correct (as expected)?
3. Is the operation valid and properly signed, and is the requesting_user privileged (authorized) to conduct the operation?
4. Is the user free from already pending operations?

If either one of these checks 1, 2, 3 or 4 fails, then one of two things happens. If the processing node in question received the transaction information from another node, the processing node votes no, and the sending node is notified of this vote. If, on the other hand, the processing node in question received the transaction information from a user (the processing node is a receiving node of a transaction request), the transaction is fast rejected, without the node in question performing any more work and without the transaction information being distributed to the additional nodes.

In this and other embodiments, when nodes 150, 160, 170 send proposed transactions between them, they attach their respective vote to the information passed. This means that each node 150, 160, 170 can tell already from the received transaction information whether the node is contacted in its capacity as a first transaction receiving node (receiving the transaction request from a client 110, 120, 130) or a secondary node (receiving the transaction information from another node 150, 160, 170). Preferably, the voting information is added by the sending node to the sent transaction information, and the resulting information is signed by the voting node. A public key corresponding to a private key used for this signature is made available on the common ledger, why it is cryptographically impossible for a client to spoof such voting. If the first node receiving the transaction will vote "no" and there is no voting information in the received transaction information, the first node will fast reject rather than require the other nodes to consider the transaction.

If all checks 1, 2, 3 and 4 pass, on the other hand, then the processing node votes yes, and information about this vote is disseminated to other nodes, such as via the sending node.

If the transaction request defines a transfer of money or other funds, it is checked whether or not sufficient funds exist on the relevant account from which the funds are to be transferred. If this it not the case, the transaction can again be fast rejected by the receiving node.

Then, the receiving node signs the transaction information, and commits the user as a user which is pending for an ongoing transaction.

Thereafter, votes are collected by the receiving node and saved. If the predefined threshold of yes votes is passed, the transaction is committed. The votes, or the approved status, is sent by the receiving node to other nodes.

All nodes then check whether or not the transaction was approved in the voting. If this is not the case, the user is unpended and the transaction rejection is sent (by at least one node, such as the receiving node) back to the client 110 used by the user to request the transaction.

In case the transaction was approved, one of two things will happen.

In a first case, the transaction request is a "document change" type operation, in other words a transaction information defining an operation saving one or several documents containing information about the user. For example, the transaction information may stipulate "this is my new phone number" or "this is my new public key". The system 100 preferably has a well-defined set of possible such documents, and there may exist a list of allowed documents types (see below).

After the operation has been registered and/or executed and thus the user is unpended, the operation counter is updated as is the block state and user state. Then, a transaction approval is sent, such as to the requesting user. Several such transaction approvals may be sent, by different processing nodes.

As mentioned above, the system 100 may define several types of documents, possibly comprising the following types:

| Document type | Description |
| --- | --- |
| grid_config | Describing the nodes, their URLs, their public keys and the voting tally configuration. This decides which level of voting approval is required for nodes to commit a transaction. |
| read_auth | A 128-bit key that the requesting user submits upon read requests, the node will verify and serve these requests only if the read key matches. |
| user_info | Unverified information about the operation_user. |
| verified_user_info | Information about the operation_user that an external partner has verified about the user. This information belongs to the operation_user but cannot be updated by the operation_user. |
| write_auth | Information about the operation_user's public key, and what external users have permission to operate on this user (and to which extent). For example, a particular user in the form of a service-providing company may have permission to withdraw a value amount of 2000 shares/month from the wallet of a certain operation_user. |
| Wallet | A document containing a reference to a value store (such as a digital cryptocurrency wallet or a conventional account), and a balance. This is operated on in transfer funds transactions. |

Hence, each one of the nodes 150, 160, 170 may keep each one of these files, that are kept synchronized by all nodes 150, 160, 170 processing all transactions being requested and passing through the system 100.

Specifically regarding the user transaction counter comprised in the transaction information received in the transaction requested and included in the transaction information circulated between the nodes 150, 160, 170, this parameter forces the operation with respect to a particular user to be done in a well-defined sequence. Each node 150, 160, 170 will deny an operation if it has another opinion on the expected value of the current counter. For example, if a user has four prior registered transactions, and a new transaction request is sent with respect to the same operation_user and specifying counter=7, the transaction request will be denied. If the two different operations with respect to the same user are sent, both specifying counter=5, at most one of them will be approved by a majority of the voting nodes 150, 160, 170. As a result, double-spending rejections will be automatically handled by the voting mechanism according to the present invention, on an individual transaction basis.

Thus, the counter parameter comprised in each transaction information orders operations on a given user, but does not order operations (in relation to each other) on different users. As a matter of fact, it is preferred that the internal order between transactions being performed with respect to different registered users is not defined in the system 100. This actually provide for a more efficient system 100, since all orders in one and the same block do not need to be present in any particular order.

Specifically regarding the parameter user_state, this parameter is also comprised in the received transaction information and is circulated between the nodes 150, 160, 170. Using this parameter, both the node majority and the user (with respect to whom the transaction is performed) are forced to agree on the entire state of the history of the user. This makes it cryptographically impossible to for the system 100 to defraud the user in question. The user can validate that its history state is uncorrupted even though the rest of the ledger is hidden for the user.

Specifically regarding the ref_block_state parameter, this is also comprised in the received transaction information and is circulated between the nodes 150, 160, 170. The use of this parameter will ensure the node majority agrees on the block state, two steps (or however large the distance to the reference block used) back. This will happen without negotiations between nodes 150, 160, 170, and is handled in the normal voting process.

Specifically regarding the type_counter, this is a node-internal parameter which is not distributed between nodes 150, 160, 170 during normal processing of a transaction— but can be communicated to a node which is undergoing initiation as described above. The nodes 150, 160, 170 each maintains a history of type_counter for each user. In particular, the type_counter is a per-user map of which type of operations the user in question has requested for every counter (what was the value of the user transaction counter when that type of transaction was last requested by the user in question). This is an example for a particular user with current operation counter 5:

Counter "ReadAuth": 2
Counter "VerifiedUserInfo": 3
Counter "WalletHolder": 4
Counter "WalletRef": 5
Counter "WriteAuth": 1
last_epoch_ms: 1548590802702
operation_counter: 5
user_id:            "bcPlmBotUSuNKKGox31lLA=="

In this data, we can read, for instance, that it was at counter 1 the user changed its WriteAuth (encryption keys) the last time. This information can be used in order to perform an efficient resume.

Using some or all of the parameters specifically described above, the present inventor has discovered that a system 100 of the present type can reach throughputs of 100000 transactions per second, or even higher. This is significantly more than better-known conventional digital transaction systems, such as using the Bitcoin protocol.

In a method according to the present invention, there is no need to wait for a block being negotiated before a transaction can be committed. If a transaction is approved in the voting procedure, is will be immediately committed for registration and possible subsequent execution. Roundtrip transaction times will typically be less than one second before money is spendable for a receiving party in the example of a money transaction involving digitally stored money deposits. Confirmation to the users involved is done even faster.

Furthermore, each user sees only the operations relating to that user in question. Because of the user_state parameter being updated for each transaction, a user can detect and prove if the system 100 tries to defraud her, even though she cannot see the entire ledger. Because of the individual approval of transactions at each voting node 150, 160, 170, and further due to the fact that there is no negotiating performed between nodes of the ref_block_state (this is just a consequence of which transactions are voted "yes" and therefore committed), the protocol according to the present method can also operate at high transaction speeds. Using high performance hardware, throughputs of 1 MTPS should not be unreachable. The individual voting process also makes each node 150, 160, 170 as such horizontally scalable.

Moreover, a method according to the present invention has the potential for adding support for super-user capabilities, which may be desired for control. For instance, in the case of a setup in which assets traded in transactions of the present type are kept by the account server 140 in a closed system (as mentioned above), functions for allowing a controlling instance to lock or seize assets are readily implementable.

EXAMPLE 1: NORMAL PROCESSING OF
TRANSACTION WITHOUT REJECTION

In this example, a payment request is sent to Node #1 by a user. The following table shows select steps and dataflows:

| Step | User | Node#1 | Node#2 | Node#3 . . . |
|---|---|---|---|---|
| 1 | Send payment request to node#1 | | | |
| 2 | | Receive request, vote "yes" | | |
| 3 | | Forward request and "yes" vote to all other nodes | | |
| 4 | | | Respond with vote "yes" | Respond with vote "yes" |
| 5 | | Collect majority vote ("yes") | | |

-continued

| Step | User | Node#1 | Node#2 | Node#3 ... |
|---|---|---|---|---|
| 6 | | Perform transaction | | |
| 7 | | Send vote collection to other nodes | | |
| 8 | | Send vote on channel to payer and payee Users | Receive majority vote and perform transaction | Receive majority vote and perform transaction |
| 9 | | | Send vote on channel to payer and payee Users | Send vote on channel to payer and payee Users |
| 10 | Receive votes | | | |

EXAMPLE 2: TRANSFER MONEY OPERATION

In this example, a transfer of a money amount of value 100 is requested from a first wallet "1" to a second wallet "2".

A transaction request may look like this (in pseudo code):

```
{
  "payload": {
    "block_id":28,
    "counter": 4,
    "data": {
      "Amount": "100",
      "from_wallet_id ":"1",
      "to_wallet_id":"2"
    },
    "epoch_ms": 1549638968221,
    "grid_config_id": 1,
    "operation_type": "TRANSFER"
    "ref_block_id":26,
    "ref_block_state": "11111111...",
    "user_state": "SHA-256:10101010..." ,
  },
  " signature": {
    "key_id":"1234",
    "payload_hash": "SHA-256:11110000..." ,
    "proof":"00010001..."
  },
  "user_id": "test"
}
```

When the receiving node 150 receives a transaction request comprising this transaction information, the following verifications are performed:

1. Current user counter is "3" for user "test".
2. User "test" has no pending operations.
3. Node current time is not too far from epoch_ms.
4. Wallet "1" belongs to user "test".
5. Balance of wallet "1" is at least 100.
6. Given epoch_ms really belongs to block with block_id "28".
7. Referring block_id to block "28" is really block "26".
8. block_state for block "26" is really "11111111 . . . ".
9. user_state for user "test" is really "10101010 . . . ".
10. Payload hash is really "11110000 . . . ".
11. Proof "0001001" is a valid signature for user "test".

When any one of the nodes 150, 160, 170 collects a total voting tally showing an above-threshold approval for the requested transaction, this collecting node performs the processing of the transaction in the following operation steps:

1. Move the amount of 100 from wallet "1" to wallet "2".
2. Update counter for user "test" from "3" to "4".
3. Set user state to XOR of previous user state and payload_hash.
4. Set block_state of block_id "28" to XOR of previous block_state for block "28" and the payload_hash Hence, for a successful transaction, these steps are performed by each of the nodes 150, 160, 170 in the network, using the respective local information of the node in question at the time. However, the steps can be performed by different nodes at different points in time, depending on the information flow in the network.

Before and after registering the complete processing of the transaction, the states in each node 150, 160, 170 is according to the following table:

| OBJECT | PRE TRANSACTION | POST TRANSACTION |
|---|---|---|
| block_state(26) | 11111111 . . . | 11111111 . . . |
| block_state(28) | 01010101 . . . | 10100101 . . . |
| user_state | 10101010 . . . | 01011010 . . . |
| user_counter | 3 | 4 |
| Balance wallet "1" | 100 | 0 |
| Balance wallet "2" | 100 | 200 |

EXAMPLE 3: ADMIN WRITES USER INFORMATION

In this example, an admin user (which is a semi-super-user that has privileges to do some operations on other users, updates user info stored in the above-discussed synchronized files.

A transaction request may look like this (in pseudo code):

```
{
  "payload":
  {
    "block_id": 51666252,
    "counter": 29,
    "data": {
      "date_of_birth": null,
      "email": null,
      "full_name": "John Doe",
      "mobile": "+15555555555"
      "user_id": "EZ2j79j2QHus84LnSYl8GA==",
    },
    "epoch_ms": 1549987564172,
    "grid_config_id": 1,
    "hash_scheme": "SHA-256",
    "operation_type": "UserInfo",
    "ref_block_id": 51666250,
    "ref_block_state":"hjYG74FDkokuytju76gtFR==",
```

```
    "user_state":                              "SHA-
256:qjfsPPN17Sae/YWWmgyfd/DVWuzn7TyNeh4GZY2YgvE="
  },
  "poa": "admin",
  "signature":
  {
    "proof":
"448K78Ur5P5dcciPDjJheq+Us8YDb3owArR18po9rYX2sWQGQvoqhcz9sih6Qy28wGR1qw3
f4TuKG0A0qKPdljwfAmnyoK5G/Hgza5lvY5NtE/MBvUuWl5AAYmQq5hAx",
    "payload_hash":
"SHA-256:plil42vQ7ap2BgoYPRcGrrnAPlbJlSg3KRsRqPjMlBKO="
  }
  "user_id": "EZ2j79j2QHus84LnSYl8GA==",
}
```

When the nodes 150, 160, 170 have verified the operation and approved in a vote, each node will perform the operation (register/execute the transaction) by performing the following steps:

1. Write the information under the data clause onto the user_info document belonging to user "EZ2j . . . ".
2. Update user counter from "28" to "29".
3. Update user_state in the same way as in example 2 (above), but using the payload_hash for this operation
4. Block id is handled in the same manner as in example 2.

EXAMPLE 4: DOUBLE SPENDING TRANSACTION

In this example, a user attempts to fool the system 100 by sending two payment instructions with the same counter to all nodes, hoping both payments will go through.

The following table shows select steps and dataflows:

| Step | User | Node#1 | Node#2 | Node#3 . . . |
|---|---|---|---|---|
| 1 | Send dual payment instructions p1 and p2 to all nodes | | | |
| 2 | | Rec p1 and vote yes | Rec p1 and vote yes | Rec p2 and vote yes |
| 3 | | Rec p2 and fast reject (reason: p1 is pending) | Rec p2 and fast reject | Rec p1 and fast reject |
| 4 | | Rec p2 from Node 3, vote NO | Rec p2 from Node 3, vote NO | Rec p1 from Node 1/ Node 2, vote NO |
| 5 | | Collect p1 majority vote, YES | Collect p1 majority vote, YES | Collect p2 majority vote, NO |
| 6 | | Perform p1 | Perform p1 | Save p2 as rejected |
| 7 | | Send vote collection to other nodes | Send vote collection to other nodes | Send vote collection to other nodes |
| 8 | | Receive collections, save p2 as rejected | Receive collections, save p2 as rejected | Receive majority and perform action p1 |
| 9 | | Send votes on channel | Send votes on channel | Send votes on channel |
| 10 | Receive votes | | | |

EXAMPLE 5: HACKED NODE, DOUBLE SPENDING, GRID HALT

Here, a user tries to fool the system 100 by sending two payment instructions with the same counter to all nodes 150, 160, 170, hoping both payments will go through. This time the user is helped by Node 2, which has been hacked to approve all requests. Hence, Node 2 does not work as it should according to the present invention in this case, but has been illegally modified.

The following table shows select steps and dataflows:

| Step | User | Node#1 | Node#2 (hacked) | Node#3 . . . |
|---|---|---|---|---|
| 1 | Send payment instructions p1 and p2 to all nodes | | | |
| 2 | | Rec p1 and vote yes | Rec p1 and vote yes | Rec p2 and vote yes |
| 3 | | Rec p2 and fast reject | Rec p2 and vote yes | Rec p1 and fast reject |
| 4 | | Rec p2 from Node 2/ Node 3, vote NO | Rec p2 from Node 3, vote NO | Rec p1 from Node 1/ Node 2, vote NO |
| 5 | | Collect p1 majority vote, YES | Collect p1, p2 majority vote, YES | Collect p2 majority vote, YES |
| 6 | | Perform p1 | Perform p1 | Perform p2 |
| 7 | | Send vote collection to other nodes | Send vote collection to other nodes | Send vote collection to other nodes |
| 8 | | Prepare to perform p2. Counter already used. Note system as corrupt. | Receive collections, save p2 as rejected | Receive majority for p1. Counter already used. Note system as corrupt. |
| 9 | | REJECT ALL Transaction until manual resolv | Hacked node will be manually stopped and restored | REJECT ALL Transaction until manual resolv |

EXAMPLE 6: EXTERNAL WITHDRAWAL, PRIVATE PAYMENT USE CASE

This example schematically illustrates how the system 100 can serve private payments (payer identity known to system 100 but unknown to receiver). Here, an external user, such as an online news outlet, has been authorized with limited power to withdraw money on behalf of the unknown user, such as for payment for accessing individual news articles.

| Step | User | External user | Nodes |
|---|---|---|---|
| 1 | Authorize external user for spending with cap (max 100$/month) | | |
| 2 | | | Save external auth for user |
| 3 | Add external private reference for its wallet | | |
| 4 | | | Save private wallet reference |
| 5 | Request to read article, sends only private reference | | |
| 6 | | Perform payment, from private reference to newspaper wallet, 0.1 $ | |
| 7 | | | Since 100$ per month cap not violated, perform payment. System knows who the owner of the private ref really is. Send votes on channels. |
| 8 | Receive full info about payment | Receive info that money has been received from private ref | |
| 9 | | Serve private customer with article | |

EXAMPLE 7: "FRONTIER STATE" OF LEDGER

Each node 150, 160, 170 is arranged to (and at least some nodes actually will) save every transaction in the transaction history of the system 100, in order to be able to recreate the entire history and prove the ledger state in case of a challenge. However, in order to be able to operate as a functioning node in the system 100, and to approve/deny individual transactions, only a fraction of that state is needed.

Assume, for example, that a user has previously updated her public key contained in the write_auth document 100 times (in respective previously registered transactions). When a new transaction request is posted from this same user, it is only the current (last) version of the write_auth that is relevant when looking at verification of the signature of this transaction.

The situation is similar for a particular wallet. If a wallet's balance is 1000, it does not matter what sequence of operations had led up to this precise balance—what is important when a user wants to transfer an amount of 100.0 is that there are enough funds in the wallet to support such a transaction.

Hence, each individual node 150, 160, 170 only requires the following information in order to resume operations from a particular point in time, and to continue the processing of transaction information:

1. The last version of every document in the ledger
2. The balance of each wallet
3. The two last block states, or the number of last block states as required, on system block size configuration (however at least two last block states)

The information in the points 1-3 above is called the "frontier state" of the system 100. It is noted that the "frontier state" information is significantly less than the entire ledger. Namely, the entire ledger size is proportional to the number of operations, which is roughly O(time*#users), and the frontier state is only roughly O(#users).

Assume then that the node 160 has been down for a long time, and that the rest of the nodes 150, 170 have approved and performed a large number of transaction during this downtime. One way to resume node 160 would be to resume transactions from the last known state of the node 160 before it went down. It would take a long time to catch up for the node 160 if following this strategy. Instead, another node 170 can be manually stopped so that is does not respond to any incoming transactions. Then, this other node 170 can save its frontier state and send this information to the non-updated node 150. After this operation, both these nodes 160, 170 can resume operations from this state. Depending on system 100 configuration, from this state nodes 160, 170 may only be about 1-2 minutes behind the other nodes 150, so a quick catch-up is feasible.

Furthermore, all nodes 150, 160, 170 are arranged to (via the above-discussed digital interfaces) to ask each other regarding all transactions that have occurred in a specific block. Therefore, if a particular node is only a couple of blocks behind, it can ask another node, which is completely up-to-date, regarding the transactions in these blocks. Then, the catching-up node in question can start registering those operations on its ledger and executing document updates as the case may be. As long as the catching-up node is faster than incoming transactions it will update relatively fast.

By using the above-described frontier state functionality and the latter block operation request, each node 150, 160, 170 is capable of quick catch-up after downtimes of various length. The same mechanism can also be used when restoring a hacked node that has entered a corrupt state (as in example 5, above). Using this example 5, the manual resume procedure could look like this:

1. Stop all operations on all nodes.
2. Disregard the hacked node.
3. Recursively remove operations that have a majority vote approval, but that any of the non-hacked node refuses to perform (in the case of Example 5 there are two such operations, namely the two double-spendings that would operate on the same operation counter).
4. Verify that the block_state is identical for all non-hacked nodes.
5. Wipe clean the hacked node.
6. Save the frontier state of one of the non-hacked nodes and put that into the database of the hacked node.
7. Resume operations.
8. Contact the receivers of money from the two double-spending operations that will have cryptographic receipts of valid payments, without crediting these amounts on their respective account balances in this restored version of the ledger.
9. Negotiate potential compensation for these users, depending on what value they have sent as a consequence of the (in this case) corrupt proof of payment.

Such procedure could be performed by a controlling entity or node (not shown in FIG. 1), which has super-user status in relation to all other nodes.

Some important aspects that can be used in the present invention includes the following.

Firstly, the user operations counter is included in every transaction request sent to the system 100.

Secondly, the user state is included in every transaction request sent to the system 100.

Thirdly, the system (block) state may be included in every transaction request sent to the system 100.

Fourthly, there is an individual blockchain for each user (as described above), where each block may contain exactly one operation/transaction.

Fifthly, the system 100 may keep a current and historical ledger of type counters.

Sixthly, any node can, after an offline period, go online and produce a frontier state that is consistent with itself, and then resume operation based on this frontier state information. The frontier state is much smaller than the whole state, and can be used by other nodes to resume operations from.

Above, preferred embodiments have been described. However, it is apparent to the skilled person that many modifications can be made to the disclosed embodiments without departing from the basic idea of the invention.

For instance, many other features apart from the ones described herein can also be implemented in a system 100 arranged to perform a method according to the present invention.

In general, the various aspects of the different examples provided herein are freely intermixable. Each of these examples has been selected with the purpose of highlighting certain important aspects of the present invention.

Hence, the invention is not limited to the described embodiments, but can be varied within the scope of the enclosed claims.

The invention claimed is:

1. A method for performing an electronic transaction in a system comprising a plurality of networked computing nodes that handle electronic transactions for a plurality of users, comprising the following steps:
   a) a first computer client associated with a first user digitally sending to a first computing node of the plurality of networked computing nodes transaction information, the transaction information comprises a first user predictable transaction counter that is unique for a combination of the first user and the electronic transaction and a first user transaction state digest that is an output of a one-way function calculated based on at least an immediately preceding electronic transaction registered in relation to the first user;
   b) the first computing node affirming the transaction information based on a respective previous first user transaction counter and respective first user transaction state digest information maintained by the first computing node;
   c) the first computing node digitally communicating the transaction information to additional computing nodes from the plurality of networked computing nodes;
   d) at least one of the additional computing nodes affirming the transaction information based on respective previous first user transaction counter and respective first user transaction state digest information respectively maintained by the at least one of the additional computing nodes;
   e) at least one of the plurality of networked computing nodes verifying that at least a predetermined number of the plurality of networked computing nodes have affirmed the transaction information; and
   f) in response to the verifying in e), at least one of the plurality of networked computing nodes registering a transaction based upon the transaction information and digitally disseminating information to all of the plurality of networked computing nodes regarding a positive affirmation status made by the predetermined number of the plurality of networked computing nodes, wherein the affirming in b) and d) comprises both verifying that the first user transaction counter matches an expected value thereof based on the respective previous first user transaction counter and that the first user transaction state digest matches the respective first user transaction state digest information by comparison to the respective information maintained in the corresponding respective computing nodes of the plurality of networked computing nodes; and
   wherein the respective first user transaction state digest information is calculated as a last calculated result of a chain of one-way function calculations forming a respective and separate first user transaction chain, interlinked by respective first user transaction state digest information, the respective previous first user transaction counter and respective first user transaction state digest being information being maintained by each of the first computing node and the additional computing nodes for the first user based on the respective and separate first user transaction chains.

2. The method according to claim 1, wherein the expected value of the first user transaction counter is deterministically determined from the previous first user transaction counter used in the electronic transaction immediately preceding the electronic transaction.

3. The method according to claim 1, wherein the first user transaction counter is not unique across several different users, which different users exist in addition to the first user.

4. The method according to claim 1, wherein the first user transaction state digest is calculated as an output of a one-way function calculated based on both the last electronic transaction registered in relation to the first user and also based on other previous electronic transactions registered in relation to the first user.

5. The method according to claim 4, wherein the first user transaction state digest is calculated as an output of a one-way function calculated based on all previous electronic transactions registered in relation to the first user.

6. The method according to claim 1, wherein the additional computing nodes and the first computing node together constitute all nodes of the networked computing nodes.

7. The method according to claim 1, wherein in e), upon the verification turning out in the negative, the electronic transaction is rejected.

8. The method according to claim 1, wherein, in response to the dissemination in f), all of the computing nodes register the transaction and update their respective information regarding the current first user transaction counter and updated first user transaction state digest for use when performing d) in relation to a subsequent electronic transaction in relation to the first user.

9. The method according to claim 1, wherein the method comprises forming blocks of verified electronic transactions, each of which blocks is associated with a particular unique block identifier, and wherein said transaction information further comprises information regarding a unique block identifier associated with a previously formed one of said blocks.

10. The method according to claim 9, wherein at least one of the blocks comprises transactions in relation to the first user and a different second user.

11. The method according to claim 9, wherein the previously formed one of the blocks is not the block last formed.

12. The method according to claim 9, wherein the transaction information further comprises information regarding a transaction time stamp, which is used by the first computing node and the additional computing nodes to determine to which block the electronic transaction belongs.

13. The method according to claim 9, wherein the transaction information further comprises a block state information.

14. The method according to claim 13, wherein the block state information is calculated based on a respective hash value of each verified electronic transaction forming part of the block in question.

15. The method according to claim 14, wherein the block state information is calculated further based on block state information of previous blocks.

16. The method according to claim 1, wherein the affirming in b) and d) further comprises verifying that the first user is authorized in relation to the electronic transaction, based upon first user information previously stored in the first computing node and the additional computing nodes.

17. The method according to claim 1, wherein the transaction information further comprises a first user signature, and wherein said affirmation further comprises verifying the veracity of said first user signature.

18. The method according to claim 1, wherein the first computing node performs the verification in e).

19. The method according to claim 1, wherein all of the computing nodes individually perform the verification in e).

20. The method according to claim 1, wherein each of the first computing node and the additional computing nodes comprise one respective first user operation counter reference for a set of different types of operations a user may initiate in relation to the computing nodes, each of said first user operation counter references being arranged to reference a particular respective one value of the first user transaction counter, wherein the registration comprises the corresponding computing node updating one or more relevant ones of the first user operation counter references depending on the type of operation or operations that the electronic transaction represents.

21. The method according to claim 20, wherein the method comprises a step in which a particular computing node is initiated, whereupon the particular computing node reads a frontier state from a different computing node that has first been set in a temporary read only mode.

\* \* \* \* \*